Figure 1:
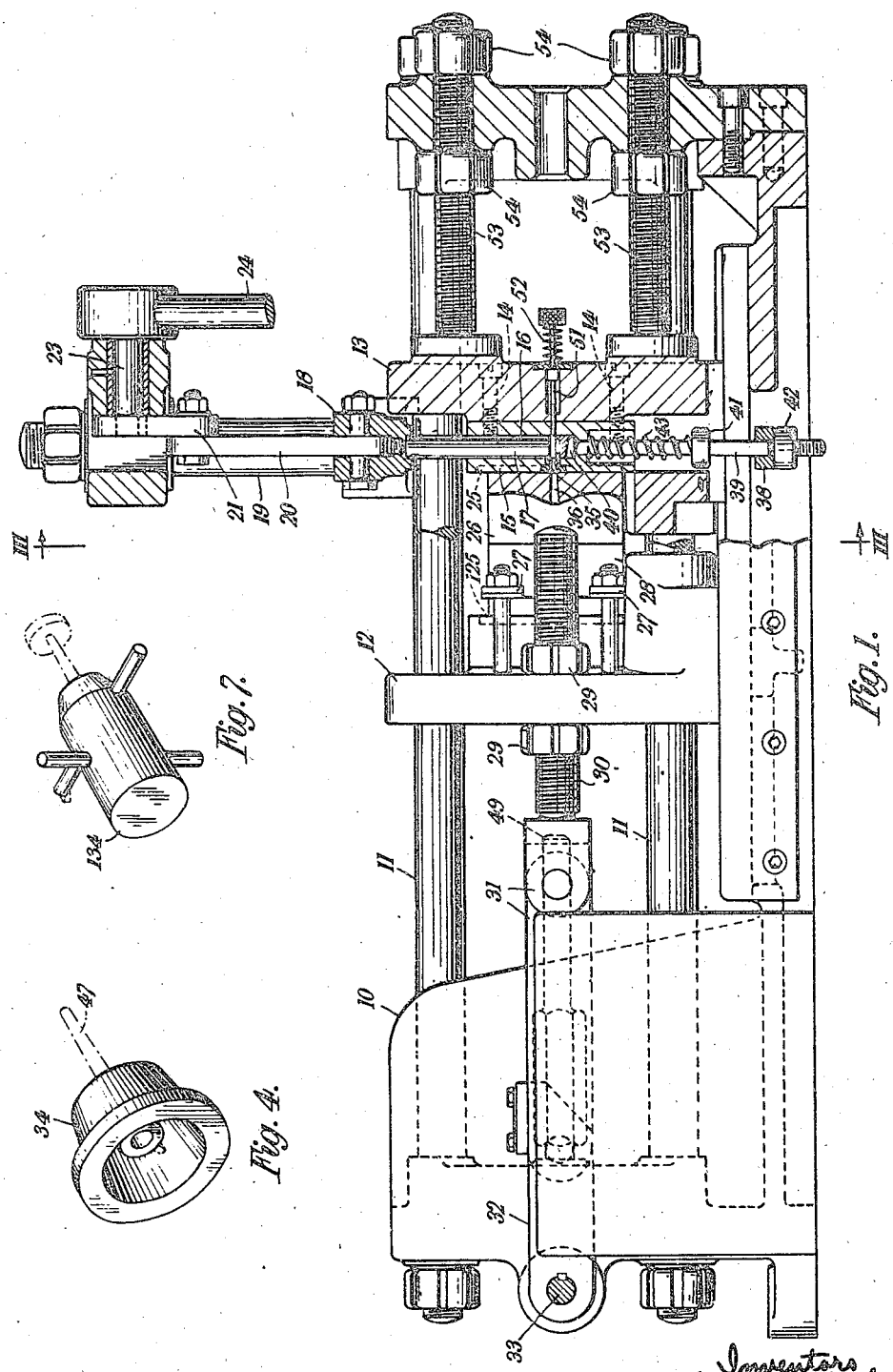

Oct. 29, 1946.  R. H. WINDSOR ET AL  2,410,324
MACHINE FOR MOLDING THERMOSETTING MATERIALS
Filed Feb. 7, 1945  5 Sheets-Sheet 3

Patented Oct. 29, 1946

2,410,324

UNITED STATES PATENT OFFICE 2,410,324

MACHINE FOR MOLDING THERMOSETTING MATERIALS

Reginald Henry Windsor and Emeric Gaspar, London, England; said Gaspar assignor to said Windsor Application February 7, 1945, Serial No. 576,656
In Great Britain December 8, 1943

8 Claims. (Cl. 18—30)

This invention has for its object to provide an improved machine for the transfer molding or injection molding of thermosetting materials.

A known machine of this type comprises a pair of platens, each carrying an internally heated mold, which are arranged to be brought together by a vertically moving hydraulic ram operating on the upper platen, the material to be molded being forced into the molds, from an axial cavity in the lower mold and radially extending sprue channels in the upper surface thereof, by an injection plunger operating in said cavity. The material may be introduced into the cavity in powder form, or as preformed pellets.

In the case of some forms of molded articles it is not practicable, or at least not economical, to use this so-called end sprue arrangement in which the material is caused to flow into the molds by an axially moving plunger moved into the end of one of the molds. For such articles the split-centre sprue arrangement is required, i. e. an arrangement in which the injection plunger moves transversely in relation to the molds through a bore formed by registering cavities in the mating faces of the molds.

The present invention provides a machine for molding thermosetting materials which is convertible at will, by adjustment of one of the platens in relation to an injection plunger which operates in a fixed path, from a condition suitable for end sprue molding to a condition suitable for split centre sprue molding.

The machine according to the invention may comprise a pair of relatively movable platens to carry the molds, an injection plunger operating in a fixed path transverse to the direction of relative movement of the platens, at least one of the platens being adjustable in relation to the plunger from a position suitable for end sprue molding to a position suitable for split centre sprue molding, and mechanism for ejecting cured sprue from the machine between successive end sprue molding operations.

One form of molding machine according to the invention comprises a supporting framework, a pair of platens mounted thereon, a mold adapted for end sprue molding detachably mounted on each platen, means for effecting relative movement of the platens to close and open the molds, a reciprocating injection plunger operating in a fixed path transverse to the direction of relative movement of the platens, a cylinder associated with one of the platens for receiving the plunger and having an inlet to the mold on that platen, and means for moving that platen in relation to the plunger from a position suitable for end sprue molding, in which, when the molds are closed, said cylinder is in register with the plunger, to a position enabling the machine to be used for split centre sprue molding on substitution of appropriate molds.

It will be understood that the mold closing gear will be arranged to ensure effective closing of the molds under all conditions of use of the machine.

For split centre sprue operation, a pair of molds is used having cooperating cavities for reception of the plunger and radially extending sprue channels, the adjustable platen being set in a position such that, when the molds are closed, their plane of contact is in axial alignment with the plunger, so that when the latter moves forward after introduction of the material into the cavity, the material will be injected transversely and centrally into the molds. For end sprue operation, the adjustable platen is moved to the appropriate position and a fresh pair of molds substituted, the mold associated with the adjustable platen having an axially extending sprue channel. Where the cylinder is fitted to the adjustable platen this channel will register with the inlet in the cylinder.

Figure 2:
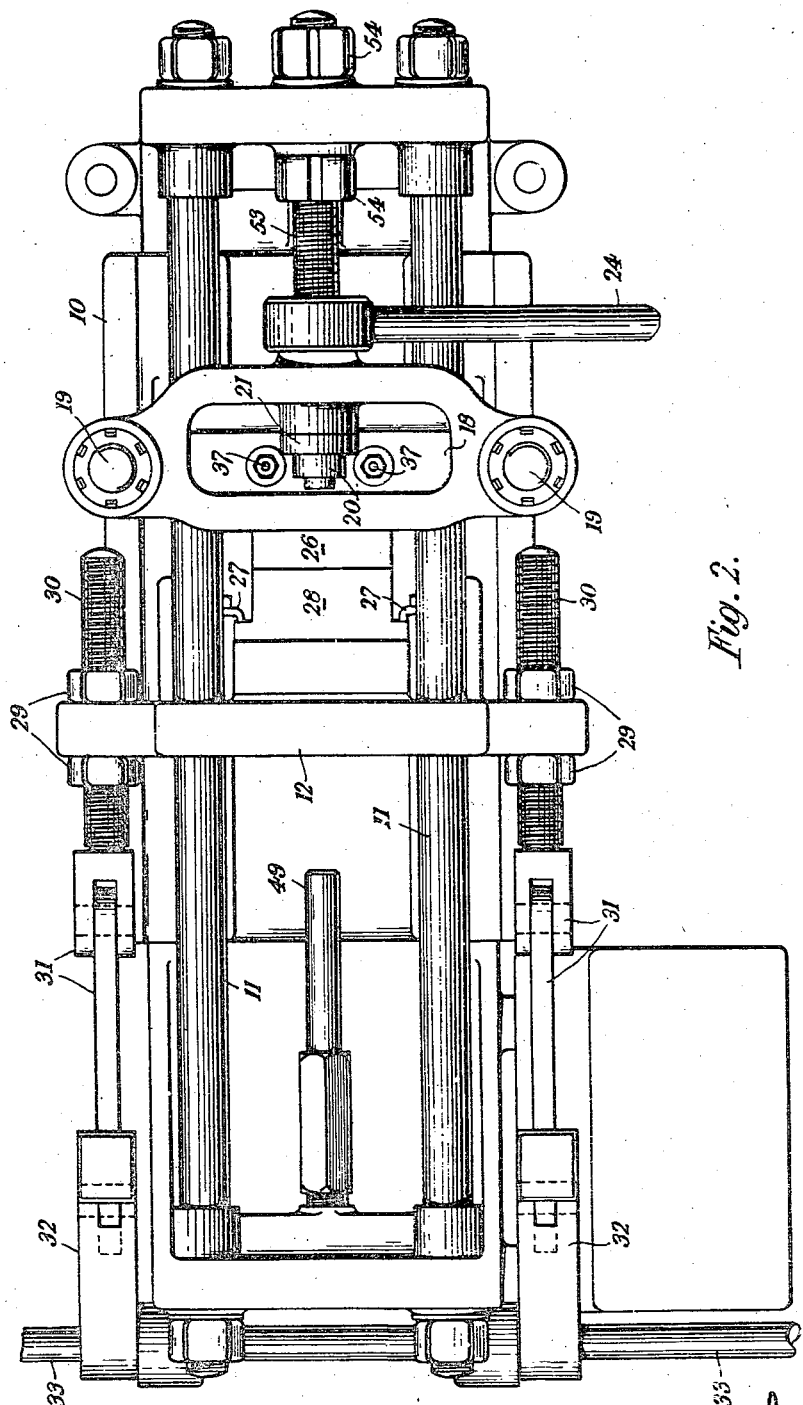
Figure 3:
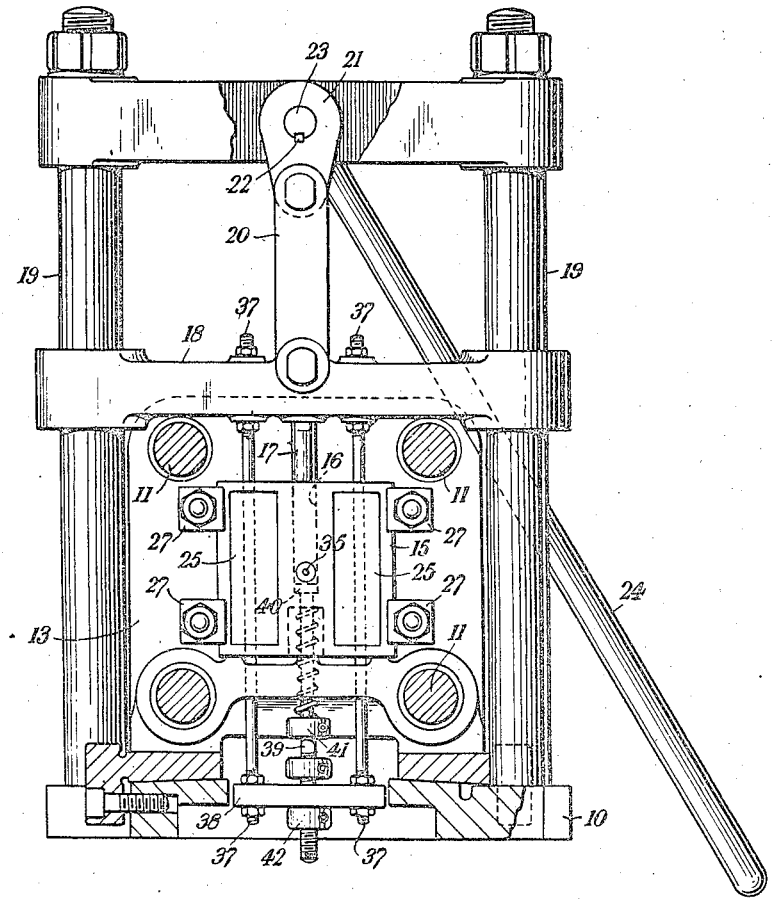

Two specific embodiments of the invention will now be described in detail, by way of example, with reference to the accompanying drawings, in which, Fig. 1 is a side elevation partly in section, of the general embodiment, showing the machine arranged for end sprue molding and with the molds closed, Fig. 2 is a corresponding plan view, Fig. 3 is a section on the line III—III in Fig. 1, but with the mold on the fixed platen removed.

Figure 9:
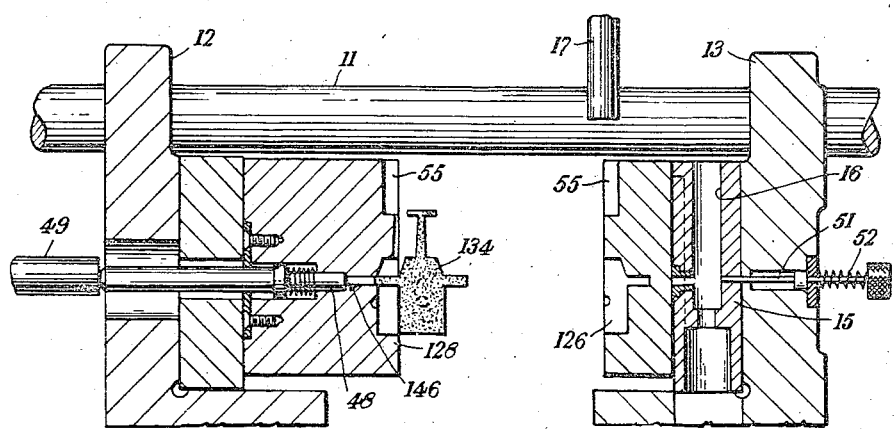
Figure 5:
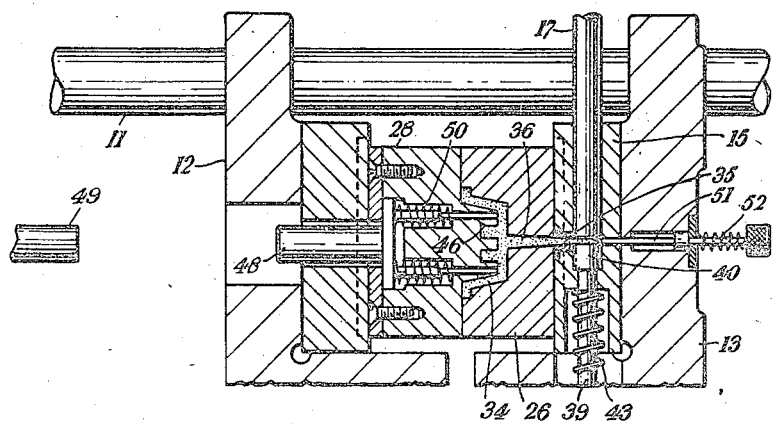
Figure 6:
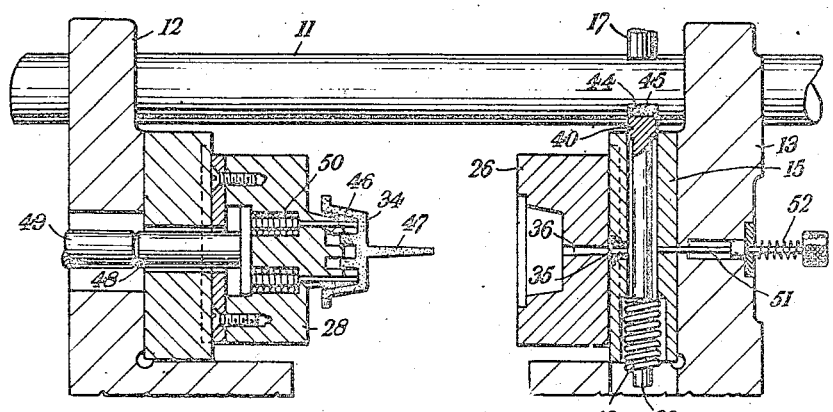
Figure 8:
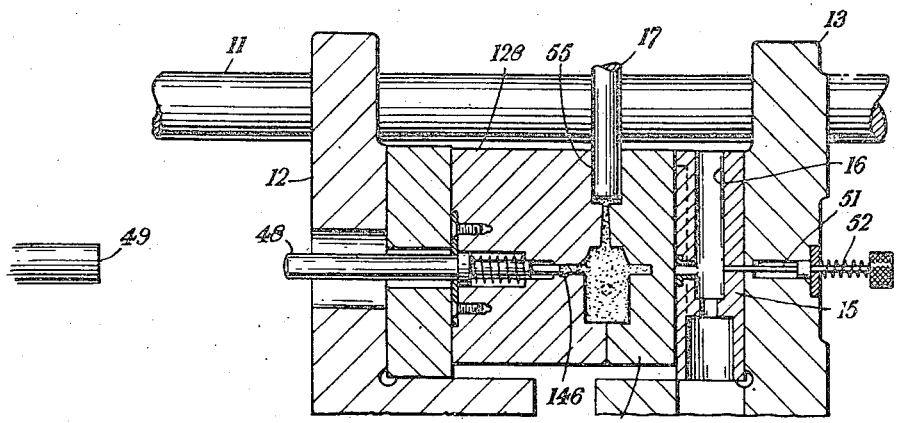
Figure 10:
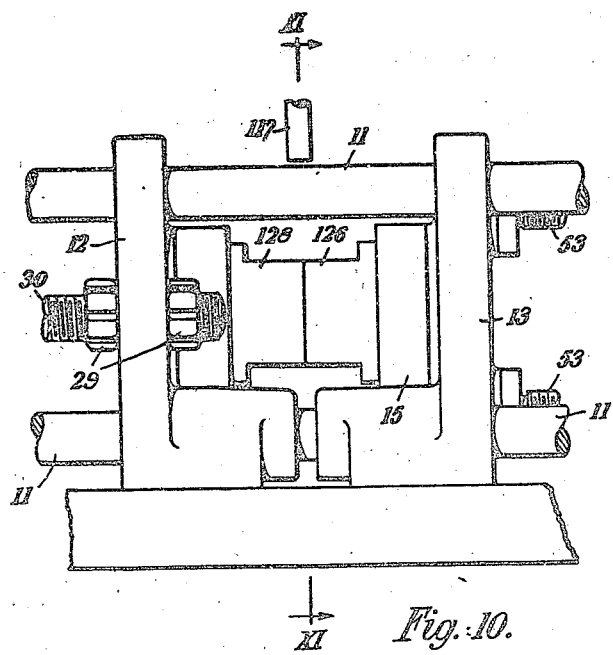
Figure 11:
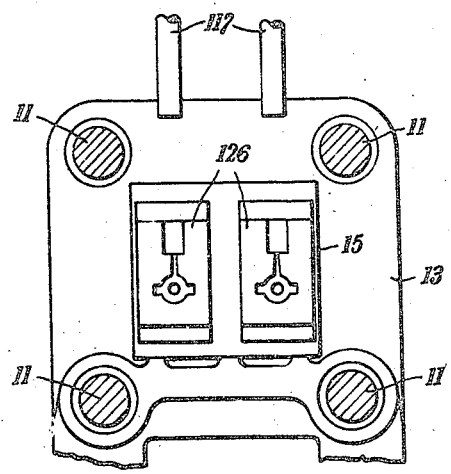

Fig. 4 is a perspective view of an article to be made by end sprue molding,

Fig. 5 is a section on an enlarged scale through the molds, when closed, which are employed for molding the article shown in Fig. 4, Fig. 6 is a view, similar to Fig. 5, showing the molds re-opened, Fig. 7 is a perspective view of an article to be made by split centre sprue molding, Fig. 8 is a sectional view, similar to that of Fig. 5, but showing the platens displaced into position for split centre sprue molding and fitted with molds, shown closed, for producing the article shown in Fig. 7, Fig. 9 is a view, similar to Fig. 8, showing the molds re-opened, Fig. 10 is a side elevation of part of an alternative form of machine, similar in all its essentials to that shown in Fig. 1, but having two molds on each platen and duplicated injection plungers, the machine being shown arranged for split centre molding, and Fig. 11 is a section on the line XI—XI in Fig. 10.

Like reference characters designate like parts throughout the figure.

Referring first of all to Figs. 1–9, the machine framework 10 includes four horizontal tie bars 11 on which are supported a moving platen 12 and a fixed platen 13. The machine will first be described with reference to Figs. 1–6, in which the parts are shown in the positions which they occupy for end sprue molding. On the front of the fixed platen 13 is fixed, by screws 14, a cylinder block 15 having a vertical cylinder bore 16 to accommodate a vertically reciprocating injection plunger 17.

The injection plunger 17 is fixed to cross head 18 which is slidable on a pair of upright columns 19 and operated by a pair of toggle links 20, 21, the upper of which 21 is keyed, by a key 22 to a spindle 23 which is rotatable by means of a hand lever 24. At the front of the cylinder block 15 are formed cavities 25 (Fig. 3) for the reception of electrical heater units (not shown) for heating the cylinder block and a mold 26 mounted in front of the cylinder block, and held in position thereon by clamps 27 (Fig. 3).

A companion mold 28 is supported on the front face of the movable platen 12 by similar clamps 27, and the movable platen 12 has heaters similar to those associated with the fixed platen, these being accommodated in recesses 125 in the movable platen. The movable platen is attached, by nuts 29, to a pair of parallel screw threaded rods 30 each of which is coupled by a toggle linkage 31 to a crank 32 fixed to a shaft 33. By rotation of the shaft 33 therefore the movable platen 12 can be moved towards the fixed platen 13 to close the molds, or away from it to open the molds.

The molds 26, 28 are correctly centered and registered with regard to their respective platens by projections (not shown) on the rear of the molds engaging with corresponding recesses in the front faces of the platens. The molds 26, 28 are designed to mold an article 34 of the shape indicated in Fig. 4, and when closed, form between them a molding cavity of appropriate formation as shown in Fig. 5. The cylinder block is formed with a forwardly extending diverging inlet 35 to the mold 26, the inlet registering with a diverging axial passage 36 in the mold which leads to the mold cavity.

Attached to the cross head 18 are a pair of downwardly depending rods 37 joined at their lower ends by a cross bar 38. Slidable in a hole in the cross bar is an ejection plunger 39 having a head 40 at the top end which fits closely within the bore 16. A pair of nuts 41, 42 are fitted to the lower end of the ejection plunger and a spring 43 held in compression between the nut 41 and an abutment on the cylinder block 15 urges the ejection plunger downwardly.

To charge the machine, a pellet of molding powder is placed in a cavity 44 in the top of the ejection plunger when the latter is in the up position shown in Fig. 6, to which it is brought by anti-clockwise rotation through 180° of the handle 24 from the position shown in Fig. 3. The molds are then closed, by rotating the shaft 33 by means of a handle (not shown). The handle 24 is then moved to the position of Fig. 3, the injection plunger 17 then descending and forcing the molding powder, which is rendered plastic by the heaters, into the molds as shown in Fig. 5. The ejection plunger 39 is moved down with the injection plunger by reason of the abutment of the cross bar 38 against the nut 42. After a time sufficient for curing, the handle 24 is returned to its previous position, thereby raising the injection plunger 17. During this upward movement the cross bar 38 presses against the nut 41, lifting the ejection plunger and causing it to break off from the sprue in the inlet 35 of passage 36 the residual cured material 45 in the cylinder bore, and raise this out of the cylinder, as shown in Fig. 6, into a position where it can be removed and replaced by a fresh pellet of uncured material.

The die 28 has a recess 46 which will be filled with the material, and so form a projecting tooth on the molding which will ensure that the molding and sprue, shown at 47 in Fig. 6, will come away with the movable platen 12 when the molds are opened. Shortly before the movable platen reaches its fully retracted position, an ejector 48 on the mold 28 comes in contact with a fixed ejector pin 49 and is forced forward against the action of springs 50 to eject the molded article as shown in Fig. 6.

In case the sprue should break off and remain sticking in the inlet 35 or passage 36, this can be cleared manually by pushing in a plunger 51, which is normally held projected by a spring 52.

It will be appreciated that, although the cylinder block 15 has been described and illustrated as a separate unit attached to the fixed platen 13, the cylinder bore to receive the injection plunger could, as an alternative, be formed integrally with the platen 13 or with the mold 26 fixed thereto.

To the rear of the platen 13 are fitted two screw-threaded rods 53 which are located in relation to the framework by nuts 54. When it is desired to convert the machine to the split centre sprue arrangement, the rods 37 and extractor plunger 39 are detached from the cross head 18 and the fixed platen 13 moved to the right, by adjustment of the nuts 54, to the position in relation to the injection plunger 17 shown in Fig. 8. The molds 26, 28 are removed from the platens and replaced by molds 126, 128 suitable for centre sprue molding. The movable platen 12 is adjusted in relation to the toggles 31 by adjustment of the nuts 29, so that when the toggles are straight the molds 126, 128 will be effectively closed as shown in Fig. 8.

Fig. 7 shows an article 134 which could not be molded by the end sprue method without the use of split molds and their attendant inconveniences. The molds 126, 128 are of appropriate shape to produce this article. As will be apparent from Figs. 8 and 9, these molds have in their mating faces cooperating half-cylindrical cavities to receive the injection plunger 17, the pellet of molding powder being fed into the recess formed by these cavities after the molds have been closed and before the plunger 17 descends. As before the mold 128 has a recess 146 to ensure that a tooth will be formed on the molding and cause it to come away with the mold 128 and be ejected by the ejector as shown in Fig. 9.

It will be understood that, in place of manual operation of the toggles 31 for closing the molds, these may be operated pneumatically or hydraulically. Again, a motor driven screw can be used for operating the movable platen in place of toggles. Similarly the injection plunger can be operated pneumatically or hydraulically instead of by hand, or by a motor driven screw in place of toggles.

Instead of arranging the platens for horizontal movement and the injection plunger for vertical movement, the platens can of course be arranged to move vertically and the injection plunger horizontally.

The alternative machine shown in Figs. 10 and 11 is in every respect similar to that already described, except that a pair of molds is mounted on each platen, the molds on the fixed platen 13 being indicated by the reference 126 and those on the movable platen (only one of which is visible in the figures) by the reference 128. The injection plungers are duplicated, being indicated by the reference 117. Further description of this alternative arrangement is believed to be unnecessary because it operates in essentially the same fashion as that shown in Figs. 1-9, the two plungers 117 moving together under the control of the operating handle.

The advantage of using a pair of molds on each platen is that an increased output can be obtained from the machine, for the reasons set forth in our copending application Serial No. 558,718, which describes the application of a similar principle to injection molding machines for thermoplastic materials.

As a further alternative, the movable platen may be split into two, each portion carrying a mold and having an independent operating mechanism. The fixed platen, which will be adjusted as before to a new position when the change is made from end sprue to split centre sprue molding may also be similarly split, each half having a separate adjusting mechanism.

In the case where split platens are used, the control mechanisms for determining the timing and duration of closure of the molds, which mechanisms may be hydraulic, pneumatic or mechanical, are conveniently independent, so that different curing times may be used for the two molds. This may be desirable either because different molding powders are being used in the two molds, or because moldings of different thickness are being made in the two molds.

What we claim as our invention and desire to secure by Letters Patent is:

1. A machine for molding thermosetting materials, which can be used at will for end sprue or split centre sprue molding, comprising a supporting framework, an adjustable stationary platen and a movable platen mounted on said framework, each platen being adapted to carry a mold, means for moving the movable platen in relation to the fixed platen to open and close the molds, a reciprocating injection plunger operating in a fixed path extending transversely to the direction of movement of the movable platen, a cylinder block mounted on the face of the stationary platen and arranged to cooperate with the injection plunger for end sprue molding, and means for adjusting the stationary platen in relation to the framework from a position in which the cylinder block is in register with the injection plunger to a position wherein the plunger is located in the parting plane of the molds suitable for split centre sprue molding, said cylinder block having a diverging passage transverse to the bore thereof which constitutes an inlet to the mold during end sprue molding.

2. A machine for molding thermosetting materials, which can be used at will for end sprue or split centre sprue molding, comprising a supporting framework, an adjustable stationary platen and a movable platen mounted on said framework, each platen being adapted to carry a mold, a toggle mechanism for moving the movable platen in relation to the stationary platen to open and close the molds, a reciprocating injection plunger operating in a fixed path extending transversely to the direction of movement of the movable platen, a cylinder block mounted on the face of the stationary platen and arranged to cooperate with the injection plunger for end sprue molding, and means for adjusting the stationary platen in relation to the framework from a position in which the cylinder block is in register with the injection plunger to a position wherein the plunger is located in the parting plane of the molds suitable for split centre sprue molding, said cylinder block having a diverging passage transverse to the bore thereof which constitutes an inlet to the mold during end sprue molding, and said movable platen being adjustable relatively to said toggle mechanism to insure effective closing of the molds under all conditions of operation.

3. A machine for molding thermosetting materials, comprising a supporting framework, a fixed platen and a movable platen mounted thereon, a mold adapted for end sprue molding detachably mounted on each platen, means for moving the movable platen to close and open the molds, a reciprocating injection plunger operating in a fixed path transverse to the direction of relative movement of the platens, a cylinder associated with the fixed platen for receiving the plunger and having an inlet to the mold on that platen, an ejector plunger mechanically coupled to the injection plunger and operating to eject residual cured material from the bore of said cylinder, and means for moving the fixed platen in relation to the plunger from a position suitable for end sprue molding, in which, when the molds are closed, said cylinder is in register with the plunger to a position wherein the plunger is located in the parting plane of the molds, thus enabling the machine to be used for split centre sprue molding on substitution of appropriate molds.

4. A machine as claimed in claim 3, in which the ejector plunger is detachable from the injection plunger so as to be removable when the machine is to be used for split centre sprue molding.

5. A machine as claimed in claim 1, having a manually operable ejector for clearing sprue from the passage constituting the inlet from the cylinder to the associated mold.

6. In a machine for molding thermosetting materials, the combination comprising stationary tie bars, an adjustable stationary platen affixed to said tie bars, a movable platen slidably mounted on said tie bars, means for removably securing a mold to each of said platens, whereby either a set of molds for end sprue molding or a set of molds for split center sprue molding may be mounted on said platens, means for moving said movable platen in relation to said fixed platen to open and close the molds, a cylinder block carried by said stationary platen, and having a bore extending transversely of the direction of movement of said movable platen and a passage transversely of said bore establishing communication between said bore and the mold cavity of one of the end sprue molds, a reciprocable injection plunger in registry with said bore and operable in a fixed path transverse to the direction of movement of the movable platen, and means for adjusting the stationary platen on said tie bars from a position in which said plunger operates at one end of the mold cavity defined by one set of molds for end sprue molding, to a position in which said plunger operates in the parting plane of the molds of the other set for split center sprue molding.

7. In a machine for molding thermosetting materials of the type described in claim 6, the combination comprising a second injecting plunger operable in a fixed path in alignment with said first-mentioned injecting plunger for end sprue molding, and mounting means for said second injecting plunger permitting said latter plunger to be rendered inoperative during split center sprue molding.

8. In a machine for molding thermosetting materials, the combination comprising stationary tie bars, an adjustable stationary platen, a movable platen slidably mounted on said tie bars, means for removably mounting a mold on each of said platens, whereby either a set of molds for end sprue molding or a set of molds for center sprue molding may be mounted on said platens, a cylinder block carried by said stationary platen, and having a bore extending transversely of the direction of movement of said movable platen and a passage transversely of said bore establishing communication between said bore and the mold cavity of one of the end sprue molds, a reciprocable injection plunger operable in a fixed path transverse to the direction of movement of the movable platen and operable in the bore of said cylinder block for end sprue molding, means for moving said movable platen in relation to said stationary platen to open and close the molds, and means for adjusting the stationary platen on said tie bars from a position in which said plunger operates in said cylinder block at one end of the mold cavity defined by one set of molds for end sprue molding, to a position in which said plunger operates in the parting plane of the molds of the other set and transversely away from the position of the bore of said cylinder block for split center sprue molding.

REGINALD HENRY WINDSOR.
EMERIC GASPAR.